3,775,329
LUBRICANT COMPOSITIONS CONTAINING A VISCOSITY INDEX IMPROVER

Rudolf J. A. Eckert, Amsterdam, Netherlands, assignor to Shell Oil Company, New York, N.Y.
No Drawing. Filed Nov. 4, 1971, Ser. No. 195,846
Claims priority, application Great Britain, Nov. 13, 1970, 54,176/70
Int. Cl. C10m 1/16
U.S. Cl. 252—59        6 Claims

ABSTRACT OF THE DISCLOSURE

The viscosity index of lubricating oils is substantially increased by the presence of a minor amount of a hydrogenated tapered copolymer of isoprene and a monovinyl aromatic compound.

---

The invention relates to lubricant compositions having improved properties, in particular to lubricating oil compositions having an improved viscosity index and improved viscosity characteristics at low temperatures.

BACKGROUND OF THE INVENTION

It is known that the viscosity of lubricating oils varies with temperature. Since many oils are to be used at widely divergent temperatures, ranging from, for instance, about $-20°$ C. to about $+150°$ C. (e.g. in automotive engines), it is of paramount importance that the lubricating oil should be able to fulfil its lubricating function over a wide temperature range; it should, for example, neither be too viscous at low temperature nor to thin-flowing at high temperature. Lubricating oils are often classified in a system based on their viscosity at $99°$ C. ($210°$ F.) and $-18°$ C. ($0°$ F.) according to crankcase oil viscosity classification SAE J300a; for an oil to fall within a specification, wherein a number without a W is based upon the viscosity at $99°$ C. and a number with a W on the viscosity at $-18°$ C. the viscosity measured at the temperatures mentioned must meet specified values. According to these values oils may belong to general classes such as 20W/20, 10W/30, 20W/40, 10W/50 etc.

Another measure for the temperature-viscosity relationship of an oil is the so-called viscosity index (VI) which can be determined according to the ASTM–D2270 method. The higher the VI of an oil, the less the dependence of the viscosity on temperature.

In general the VI of lubricating oils obtained by conventional processes from mineral oils is not high enough to enable them to meet the very high demands with respect to viscosity made thereon in modern automotive engines. For this reason several compounds have been proposed, which, when added to a lubricating oil, increase its VI, and gives the oil a wider application range due to its classification in the SAE scheme in accordance with its viscosities at $99°$ C. and $-18°$ C, as discussed above. These compounds, which in most cases are polymeric compounds, are called VI-improvers.

In order to be a good VI-improver, a compound must not only have a beneficial influence on the VI in a fresh lubricating oil, but it must remain stable and perform its VI-improving function also when the oil is in use in an engine or in another device. For this reason a good VI-improver must be shear-stable and have a high resistance to high temperatures, oxygen and acids. Furthermore it is desirable that a VI-improver should have a beneficial influence on the pour point of the lubricating oil in which it is incorporated, or, at least, that it should not have a disturbing influence on the function of pour-point depressants. Pour-point depressants are additives which are incorporated in lubricating oils in order to keep the oil fluid at low temperatures.

Modern developments in lubricating oil technology show a trend to the manufacture of oils which contain a low proportion of aromatic compounds, and have a high VI (e.g. 100 and higher). Hydrogenated random styrene-diene copolymers, such as hydrogenated random styrene-butadiene copolymers especially with high molar ratios of styrene and butadiene which are soluble in conventional lubricating oils, have the drawback that they are less soluble and often nearly insoluble in the oils with a high VI mentioned, and accordingly cannot be used to improve the viscometric properties thereof.

SUMMARY OF THE INVENTION

A type of compound has now been found which is very suitable for use as VI improver, because it meets all the requirements discussed, which type of compound consists of hydrogenated tapered copolymers of isoprene and monovinyl aromatic compounds.

The invention therefore relates to a lubricant composition comprising a major amount of a lubricant and a minor amount of a hydrogenated tapered coplymer of isoprene and a monovinyl aromatic compound with a number average molecular weight of at least 5000.

The term "tapered copolymer" as used in this application denotes both "single tapered copolymer" and "multiple tapered copolymer."

A single tapered copolymer according to the invention is a copolymer obtained by copolymerizing in hydrocarbon solution the monomers of a mixture comprising isoprene and a monovinyl aromatic compound in the presence of an alkali metal or an alkali metal compound as a catalyst until at least 80% of the conjugated diene present in the original mixture has been incorporated in the copolymer.

During the copolymerization the copolymer molecules are "living" i.e. they are able to grow by incorporation of monomer molecules. At the desired moment the copolymerization is brought to an end by addition of a compound which reacts with each living copolymer molecule, inactivating it for further incorporation of monomer molecules. As examples of these types of compounds suitable to be used in the preparation of single tapered copolymers may be mentioned compounds with one or more active hydrogen atoms such as water, alcohols (e.g. methanol, ethanol, isopropanol) or carboxylic acids (e.g. acetic acid), compounds with one active halogen atom, e.g. a chlorine atom (e.g. benzyl chloride, chloromethane), compounds with one ester group, and carbon dioxide. The copolymerization may also be brought to an end by hydrogenation as described further on.

In general at least 90, in particular 95% and more in particular at least 99% of the isoprene present in the original mixture will have been incorporated in the living copolymer before the copolymerization is brought to an end. The amount of monovinyl aromatic compound incorporated in the living polymer before the copolymerization is brought to an end will in general be at least 85%, in particular at least 95% of the vinyl aromatic compound present in the original mixture. Most preferably, substantially all of the monomer molecules present in the original mixture have been incorporated in the living tapered copolymer before the copolymerization is brought to an end.

Since during the preparation of a single tapered copolymer, the tendency to be incorporated in a copolymer molecule of the isoprene (monomer A) greatly exceeds that tendency of the monovinyl aromatic compound (monomer B), the composition of each copolymer molecule formed during copolymerization gradually changes from that of nearly pure poly-A to that of nearly pure poly-B. Therefore in each copolymer molecule three regions can be discerned, which gradually pass into each other, and which have no sharp boundaries. One of the outer regions consists nearly completely of units derived from monomer A, and contains only small amounts of units derived from monomer B, in the middle region the relative amount of units derived from monomer B greatly increases and the relative amount of units derived from monomer A decreases, while the other outer region consists nearly completely of units derived from monomer B and contains only small amounts of units derived from monomer A. It is essential for single tapered copolymers that the outer regions do not consist of one pure homopolymeric block of units derived from either A or B, but that a few units of respectively B or A are present therein.

It is known that the presence of polar compounds which are different from the catalyst and which do not inactivate the catalyst (so-called randomizers) in the polymerizing mixture, brings about a tendency to random copolymerization of conjugated dienes and vinyl aromatic compounds in the presence of an alkali metal or an alkali metal compound as a catalyst. Since randomization is to be avoided in the tapered copolymers according to the invention, virtually no randomizer is allowed to be present in the polymerizing mixture. Preferably, the use of a randomizer is fully avoided.

The term "tapered copolymers" as used in this specification also comprises "multiple tapered copolymers", which term denotes polymers consisting of two or more of the single tapered copolymers described above, which are bound to each other. Several methods can be used for the preparation of multiple tapered copolymers. A multiple tapered copolymer may, for example, be prepared as follows: in a first step a mixture of isoprene and a monovinyl aromatic compound in hydrocarbon solution is copolymerized in the presence of an alkali metal compound until all or nearly all monomers present have been incorporated in the growing polymer molecules; subsequently a mixture of isoprene and a monovinyl aromatic compound, whose composition is equal to or different from that of the starting mixture in the first step with regard to type of the monomers and molar ratios thereof, is added in a second step to the living single tapered copolymer obtained in the first step, whereupon the polymerization is continued and finally brought to an end by addition of a compound which inactivates the growing copolymer molecules for incorporation of monomer molecules, or by hydrogenation as described hereinafter. In this way a copolymer consisting of two single tapered copolymers bound to each other is obtained.

Multiple tapered copolymers can also be obtained in several other ways such as by using a multi-functional catalyst in the polymerization of mixtures comprising isoprene and a vinyl aromatic compound and bringing the polymerization to an end as described above. It is also possible to prepare multiple tapered copolymers by coupling of two or more living tapered copolymer molecules. This can be achieved by addition of a compound which reacts with two or more living single tapered copolymer molecules. As examples of this type of compound may be mentioned compounds containing two or more ester groups, compounds with more than one active halogen atom, e.g. di- and trichloromethylbenzene, carbon tetrachloride, dimethyldichlorosilane, 1,2-dichloroethane, 1,2-dibromethane, and the like. Another possible method for preparing multiple tapered copolymers consists in the preparation of a single tapered copolymer containing a reactive group in the molecule (e.g. a carboxyl group, which is for example, obtained by bringing the polymerization of a single tapered copolymer to an end by addition of carbon dioxide) and coupling of two or more of the molecules to obtained e.g. by esterfying them with a di- or polyvalent alcohol.

Not only linear multiple tapered copolymers can be prepared in the ways described, but also star-shaped, graft and comb-shaped multiple tapered copolymers.

The use of tapered copolymers which are single tapered copolymers will in general be preferred for the preparation of hydrogenated tapered copolymers according to the invention.

Among the alkali metal or alkali metal compounds to be used as a catalyst in the preparation of tapered copolymers, lithium and lithium compounds, in particular lithium hydrocarbyl compounds are preferred. Lithium hydrocarbyl compounds wwhich are very suitable to be used are unsaturated compounds such as allyllithium, methallyllithium, aromatic compounds such as phenyllithium, the tolyllithiums, the xyllithiums and the naphthyllithiums, and in particular alkyllithiums such as methyllithium, ethyllithium, propyllithium, n-butyllithium, amyllithium, hexyllithium, 2-ethylhexyllithium, and n-hexadecyllithium. Sec-butyllithium is preferred as catalyst. Multifunctional compounds such as di-alkali metal hydrocarbons, e.g. dilithium hydrocarbons, can also be used as catalysts as discussed above.

Mixtures of lithium compounds also make suitable catalysts, such as mixtures of lithium hydrocarbyl compounds, or mixtures of one or more lithium hydrocarbyl compounds and one or more compounds containing an OLi group. Examples of compounds containing an OLi group are lithium alkoxy compounds such as lithium methoxide, lithiumethoxide lithiumbutoxide, lithium 2-sec-butyl-2-butoxide, lithium 2-sec-butyl-2-propoxide, lithium 2-ethoxy-ethoxide, lithium 2-(dimethylamino)-ethoxide. Compounds wherein the OLi group is bound to a sulfur atom can also be used, e.g. $C_4H_9$—$S(CH_3)_2$—OLi. Mixtures of an alkyllithium (e.g. sec-butyllithium) and a lithium alkoxy compound (e.g. lithium 2-sec-butyl-2-butoxide) are very suitable.

The copolymerization is to be carried out in a hydrocarbon solvent. Very suitable hydrocarbon solvents are aliphatic hydrocarbons, e.g. pentane, hexane, heptane, octane, 2-ethylhexane, nonane, decane, cyclohexane, methylcyclohexane, or aromatic hydrocarbons, e.g. benzene, toluene, ethylbenzene, the xylenes, diethylbenzenes, propylbenzenes. Mixtures of hydrocarbons can also be used.

The copolymerization may be carried out at any desired temperature in the range from $-50$ to $+150°$ C., and is preferably effected at a temperature between $-20°$ C. and $+80°$ C.

The polymerization can be carried out under any pressure, but since it is desirable to maintain the monomers and the solvent substantially in the liquid phase, the pressure applied preferably is at least sufficient to keep the monomers and the solvent in the liquid state. The pressure to be applied thus will depend on the temperature of the copolymerization and on the types of monomers and solvent components used. If desired, higher pressures can be used, for instance by pressurizing with an inert gas, such as nitrogen.

The molecular weight of the tapered copolymers of isoprene and a monovinyl aromatic compound which after hydrogenation are to be used as components of the lubricant compositions according to the invention may vary between wide limits, for instance between 5,000 and 500,000, in particular between 10,000 and 400,000. These are expressed as number average molecular weights, determined by osmotic pressure method or tritium counting procedures.

Very good results are obtained at molecular weights between 20,000 and 125,000. The molecular weight is regulated by the ratio of the number of moles of catalyst (e.g. butyllithium) to the number of moles of monomers present during polymerization; the number of units originating from the monomers in a polymer molecular is substantially equal to the ratio of the number of moles of monomer to the number of moles of catalyst (assuming that each catalyst molecule contains one alkali-metal atom) present during polymerization, provided that no contaminants which give rise to side reactions with the catalyst (such as oxygen, water, carbon dioxide) are present. If single tapered copolymers are coupled together, the multiple tapered copolymers formed have molecular weights which can be calculated from the molecular weight of the single tapered copolymers and the number thereof which are coupled together.

When the polymerization has been completed and preferably virtually all of the monomer molecules which were present in the polymerizing mixture have been incorporated into the copolymer, the living copolymer thus obtained can be hydrogenated as discussed above in order to obtain the hydrogenated tapered copolymers according to the invention. It is also possible, however, to bring the copolymerization to an end by addition of a compound as discussed above, and if desired, to recover the copolymer before hydrogenation. After bringing the copolymerization to an end the copolymer can be recovered in any desired way, for instance by precipitation, which can be effected by addition of relatively large amounts of non-solvents for the copolymer such as an alcohol, e.g. methanol, ethanol or isopropanol.

It is to be preferred, however, that the—if desired, living—copolymer is not recovered, but is kept dissolved and is hydrogenated in the solvent in which it has been prepared.

The monovinyl aromatic compound to be incorporated in the tapered copolymer according to the invention may consist of a vinyl di- or poly aromatic compound, such as vinylnaphthalene, but preferably the vinyl aromatic compound is a monovinyl monoaromatic compound, such as styrene or alkylated styrenes or halogen containing styrenes. The alkyl group in the alkylated styrene may contain 1–20 and more carbon atoms, preferably 1–4 carbon atoms and may be attached to the alpha-carbon atom of the styrene (as, for instance, in alpha-methylstyrene) or to the aromatic ring (as, for instance, in o-, m- or p-methylstyrene, the ethylstyrenes, the propylstyrenes, the isopropylstyrenes, the butylstyrenes, the isobutylstyrenes, the tert-buytlstyrenes, such as p-tert-butylstyrene). Alkylated styrenes containing more than one alkyl group are also very suitable; as examples may be mentioned the vinylxylenes, the methylethylstyrenes, the ethylvinylxylenes.

Tapered copolymers built up from isoprene and styrene and/or p.tert-butylstyrene are very suitable.

The molar ratio of isoprene to the vinyl aromatic compounds to be incorporated in the tapered copolymers and thus in the mixture to be polymerized may vary between wide limits, but it is essential that the copolymer, after hydrogenation, should be soluble in the lubricant in which it is to be incorporated. This in general limits the amount of the monovinyl aromatic compound which can be taken into the copolymer, and depends on the structure of the monovinyl aromatic compound. Copolymers with ratios of the number of units originating from monovinyl aromatic compounds to the number of units originating from isoprene between 50 to 50 and 3 to 97, in particular between 45 to 55 and 5 to 95, are very suitable.

If desired, relatively small amounts of other monomers not being isoprene or monovinyl aromatic compounds may be incorporated in the tapered copolymers during copolymerization. As examples may be mentioned vinylpyridines, alkyl esters of acrylic and methacrylic acid (e.g. methyl methacrylate, dodecyl methacrylate, octadecyl methacrylate).

After polymerization the tapered—if desired, living—copolymers obtained must be hydrogenated in order to be used in the lubricant compositions according to the invention. The hydrogenation may be carried through to completion, i.e. all olefinic double bonds and all aromatic rings are saturated, or partially. In the latter case part of both or part of one of the two types of unsaturation (viz olefinically unsaturated bonds and aromatic rings) may be saturated.

It is preferred that at least about 90%, more in particular more than 95%, of the olefinically unsaturated bonds originally present in the tapered copolymer are saturated in the hydrogenated copolymers to be used in the lubricant compositions according to the invention. It is also preferred that less than 10%, in particular less than 5%, of the aromatic rings are saturated in the hydrogenated copolymers. Hydrogenated copolymers in which virtually all of the olefinic bonds and virtually none of the aromatic rings have been saturated during hydrogenation are very suitable.

The hydrogenation can be carried out in any desired way with any desired hydrogenation catalyst; for instance, with copper or molybdenum compounds. Catalysts containing noble metals or noble-metal compounds can very suitably be used as hydrogenation catalysts. Preference is given to catalysts containing a non-noble metal or a compound thereof of Group VIII of the Periodic Table, viz iron, cobalt and in particular nickel. As examples may be mentioned Raney nickel and nickel on kieselguhr. Special preference is given to hydrogenation catalysts which are obtained by causing metal hydrocarbyl compounds to react with organic compounds of any one of the Group VIII metals iron, cobalt or nickel, the latter compounds containing at least one organic radical which is attached to the metal atom by means of an oxygen atom, for instance as described in U.S. patent specification 3,595,942. Preference is given to hydrogenation catalysts obtained by causing aluminum trialkyls (e.g., aluminum triethyl, and in particular aluminum triisobutyl) to react with nickel salts of organic acids (e.g., nickel diisopropylsalicylate, nickel naphthenate, nickel 2-ethylhexanoate, nickel di-tert-butylbenzoate, nickel salts of saturated monocarboxylic acids obtained by reaction of olefins having from 4 to 20 carbon atoms in the molecule with carbon monoxide and water in the presence of acid catalysts), or with nickel enolates or phenolates (e.g., nickel acetonylacetonate, the nickel salt of butyrylacetophenone).

The hydrogenation of the copolymer is very suitably conducted in solution in a solvent which is inert during the hydrogenation reaction. Saturated hydrocarbons and mixtures of saturated hydrocarbons are very suitable, and—as discussed above—it is of advantage to carry out the hydrogenation in the same solvent in which the copolymerization has been effected.

The lubricant into which the hydrogenated tapered copolymer according to the invention is to be incorporated may comprise a synthetic lubricating oil, such as an ester oil, but preferably the lubricant is a mineral lubricating oil, which may have been prepared from a crude mineral oil by conventional processes, such as distillation, extraction, deasphalting, dewaxing, hydrofining, polymerization and the like. Since it is desirable to prepare lubricating oil compositions with a viscosity index which is higher than the viscosity index which can be obtaned from a crude mineral oil by the conventional processes mentioned, it is of advantage to use mineral lubricating oils prepared from paraffinic crude oils, since these lubricating oils possess a relatively high viscosity index per se, no great amounts of tapered copolymer being needed in order to obtain an attractive viscosity index.

The lubricant may also comprise fatty oils. The hydrogenated tapered copolymers according to the invention can also be incorporated in greases, distillate and residual fuels and crude oils.

The concentration of the hydrogenated tapered copolymers in the lubricant may vary between wide limits. In lubricating oils concentrations from 0.1 to 15 by weight, especially 0.1 to 9% w. are very suitable, concentrations from 1 to 6% w. being preferred.

The hydrogenated tapered copolymers according to the invention can be incorporated in the lubricant as such, but can be incorporated in the form of a concentrate (e.g., in a concentration from 10 to 50% w.) in a solvent. As solvent a lubricating oil may be used, if the solubility of the copolymer is sufficient to enable the preparation of concentrates; volatile solvents which can be removed after blending of the concentrate of the copolymer with the lubricant are also very suitable.

The lubricant compositions, in particular the lubricating oil compositions according to the invention, may in addition contain additives which are usually incorporated in lubricants. It is preferred that the lubricant composition according to the invention comprises an antioxidant (e.g., a phenolic antioxidant), and/or a detergent (e.g. a calcium petroleum sulfonate, a calcium alkylsalicylate, a polyamine containing a hydrocarbon chain with at least 50 carbon atoms, such as polyisobutenyltetraethylenepentamine, a reaction product of a polyamine (e.g., tetraethylenepentamine) and an alkylsuccinic anhydride in which the alkyl group contains at least 50 carbon atoms) and/or an E.P. additive, (e.g., a zinc dialkyl dithiophosphate), and/or a pour-point depressant, (e.g., a copolymer of method) and in some cases the VI are recorded in Table II.

In order to measure the shear stability of the oil compositions they were subjected to strong shearing forces by pressing each oil twenty times through a diesel injector under a pressure of 190 atmospheres at room temperature at the rate of 250 ml. per minute. The diesel injector used for this test is marketed by Kurt Orbahn in Hamburg as "Apparat zur Bestimmung der Scherfestigkeit von Mineralölen."

Table II shows besides the viscosity properties of the oil compositions at 210° F. and 0° F. before shearing, the kinematic viscosity at 210° F. after shearing. It can be seen that the viscosity loss due to shearing is low, except with the composition containing the polymer from Example E. In this copolymer the ratio of isoprene to styrene was very high.

TABLE I

| | Molar ratios of— | | | | Composition of starting mixture | | | | | | | |
|---|---|---|---|---|---|---|---|---|---|---|---|---|
| Experiment number | Isoprene | Styrene | Vinyltoluene | p. tert-Butylstyrene | Isoprene (g.) | Styrene (g.) | Vinyltoluene (g.) | p. tert-Butylstyrene (g.) | Cyclohexane (g.) | Sec. butyllithium (mmol.) | Olefinic bonds hydrogenated (percent) | Molecular weight, ×10$^{-3}$ |
| A | 84 | 16 | | | 71.0 | 21.7 | | | 835 | 1.03 | 99.0 | 90 |
| B | 75 | 25 | | | 61.7 | 31.4 | | | 838 | 1.14 | 98.4 | 82 |
| C | 71 | 29 | | | 56.9 | 36.3 | | | 943 | 1.30 | 96.7 | 72 |
| D | 60 | 40 | | | 46.3 | 47.2 | | | 842 | 1.24 | 99.2 | 76 |
| E | 96.5 | 3.5 | | | 113.7 | 6.3 | | | 770 | 1.05 | 98.5 | 117 |
| F | 93 | 7 | | | 107.6 | 12.4 | | | 772 | 1.39 | 99.2 | 86 |
| G | 88 | 12 | | | 99.3 | 20.7 | | | 700 | 1.36 | 98.8 | 88 |
| H | 83.4 | 8.3 | | 8.3 | 102 | 15.6 | | 24.0 | 850 | 1.48 | 97.6 | 96 |
| I | 60 | | | 40 | 46.3 | | | 72.6 | 705 | 1.06 | 97.9 | 112 |
| J | 60 | | 40 | | 46.3 | | 53.6 | | 840 | 1.06 | 98.0 | 94 |
| K | 60 | 32 | | 8 | 46.3 | 37.8 | | 14.5 | 840 | 1.06 | 97.2 | 93 |
| L | 84 | | | 16 | 71 | | | 33.5 | 710 | 1.03 | 99.1 | 101 | ethane and vinyl acetate, and in particular a polyalkyl methacrylate with an average of 12–15 carbon atoms in the alkyl chains).

DESCRIPTION OF PREFERRED EMBODIMENTS

Twelve tapered copolymers were prepared by polymerizing mixtures of isoprene and styrene and/or p.-tert.-butylstyrene and/or p.vinyl-toluene in cyclohexane solution at a temperature of 40° C. for 7 hours with the aid of sec.butyllithium as a catalyst. The amounts of the monomers, cyclohexane and sec.butyllithium used are given in Table I. The copolymerization was brought to an end by addition of a molar amount of methanol (in cyclohexane solution) 10% in excess of the molar amount of sec.butyllithium used as a catalyst. Virtually no monomers were present any more.

The copolymers present in the solutions obtained were hydrogenated by contacting the solutions with hydrogen at a pressure of 40–50 atm. at 70° C. in the presence of a mixture of nickel 2-ethylhexanoate and aluminum triethyl (molar ratio 1:2) as a catalyst until no more hydrogen was taken up. More than 95% of the olefinic double bonds had disappeared (see Table I), substantially all of the aromatic rings proved to be unchanged. The number average molecular weights are also recorded in Table I.

The hydrogenated tapered copolymers obtained in the experiments were dissolved in a HVI-60 oil together with 0.5% w. of a polymeric pourpoint depressant consisting of a polyalkylmethacrylate with an average 14.3 carbon atoms in the alkyl chains and 7.5% w. of a commercial additive mixture comprising a detergent, an antioxidant, an anti-rust additive and a lubricity improver. The amounts of the hydrogenated tapered copolymers were chosen in such a way, that in all cases a 10W/50 oil was obtained. The kinematic viscosity at 210° F. of the oil composition without tapered copolymers according to the invention was 5.67 cs.

The concentrations of the hydrogenated tapered copolymers in the oil, the kinematic viscosity of the oil compositions ($V_k$) at 210° F. and 0° F., and the dynamic viscosity ($V_d$) at 0° F. (according to ASTM-D-2602

TABLE II

| Copolymer from experiment | Percent w. copolymer in oil | Before shearing | | | | After shearing $V_k$ at 210° F. (cs.) |
|---|---|---|---|---|---|---|
| | | $V_k$ at 210° F. (cs.) | $V_{kk}$ at 0° F. (S.) | $V_D$ AE 0° F. (P.) | VI | |
| A | 2.06 | 17.6 | 180 | 18.6 | | 15.9 |
| B | 2.2 | 19.1 | 104 | 17.5 | | 18.4 |
| C | 2.2 | 18.3 | 79 | 18.3 | | 17.6 |
| D | 2.5 | 19.1 | 57.5 | 18 | | 18.2 |
| E | 1.55 | 16.9 | 61.5 | 19.7 | | 13.3 |
| F | 2.2 | 17.32 | 68.5 | 21.0 | | |
| G | 2.4 | 18.01 | 85 | 21.0 | 164 | |
| H | 2.47 | 17.36 | 69 | 20.5 | | |
| I | 3.35 | 18.23 | 62 | 22 | | 17.75 |
| J | 3.5 | 17.76 | 123 | 17 | | |
| K | 3.42 | 17.59 | 106 | 19.2 | | 17.31 |
| L | 2.8 | 18.37 | 61 | 22.5 | 162 | 17.47 |

I claim as my invention:

1. A lubricant composition comprising a major proportion of a lubricating oil and a minor proportion of sufficient to substantially improve the viscosity index of said oil of a hydrogenated tapered copolymer of isoprene and a monovinyl aroamtic hydrocarbon having an average molecular weight of at least 5,000, said copolymer having been hydrogenated to reduce at least about 90% of the olefinically unsaturated bonds, no more than 10% of the aromatic bonds having been hydrogenated, the ratio of monovinyl aromatic compound units to isoprene units being between 50:50 to 3:97.

2. A lubricant according to claim 1 wherein the oil is a mineral oil.

3. A lubricant according to claim 1 wherein the copolymer is a hydrogenated tapered copolymer of isoprene and styrene.

4. A lubricant according to claim 1 wherein ratio of monovinyl aromatic compound units to isoprene units is between 45:55 and 5:95.

5. A lubricant composition according to claim 1 wherein the average molecular weight of the copolymer is between 10,000 and 400,000.

6. A composition according to claim 1 wherein the copolymer is present in an amount between 0.1% and 15% by weight.

References Cited

UNITED STATES PATENTS

| | | | |
|---|---|---|---|
| 2,798,853 | 7/1957 | Young et al. | 252—59 X |
| 3,668,125 | 6/1972 | Anderson | 252—59 |
| 3,554,911 | 1/1971 | Schiff et al. | 252—59 |
| 2,996,455 | 8/1961 | Brown et al. | 252—59 |

DANIEL E. WYMAN, Primary Examiner

A. H. METZ, Assistant Examiner

U.S. Cl. X.R.

260—880B